2,990,306
POLYMERIC SHEET MATERIALS
Ronald Dyer, St. Albans, England, assignor to Imperial Chemical Industries Limited, London, England, a corporation of Great Britain
No Drawing. Filed June 17, 1957, Ser. No. 666,242
Claims priority, application Great Britain June 22, 1956
2 Claims. (Cl. 154—2.65)

This invention relates to the production of laminated polymeric materials that are resistant to ultra-violet radiation.

Many polymeric materials, of which vinyl chloride polymers, polystyrene, and styrene/acrylonitrile copolymers are examples, undergo discolouration and deterioration of mechanical properties on exposure to ultra-violet radiation, as present for example in sunlight. The effects of ultra-violet radiation can be reduced by incorporating in the polymeric material a substance that absorbs ultra-violet radiation. A number of such substances that are suitable for this purpose are known. These substances tend themselves to have a deleterious effect on the mechanical properties of the polymeric material, however, and being relatively expensive, also add to the cost of the product. Many of them are also coloured and therefore affect the colour of the materials in which they are incorporated.

I have now found that the discolouration of polymeric materials on exposure to ultra-violet radiation is largely confined to regions near the exposed surface and that if a substance that absorbs ultra-violet radiation is present in these regions the improvement in resistance to ultra-violet light is as great as when such a substance is present in the same concentration throughout all regions of the material. The present invention is concerned with the application of this discovery to the production of laminates from polymeric materials.

According to the present invention I provide a process for the production of a laminate by laminating together a number of laminae of polymeric material, characterised in that the external lamina on each surface of the laminate that is to be exposed to ultra-violet radiation contains a substance that absorbs ultra-violet radiation and further characterised in that at least one of the lamina making up the laminate does not contain a substance that absorbs ultra-violet radiation.

By the process of the present invention, laminated polymeric materials having good resistance to ultra-violet radiation are obtained and at the same time the aforementioned disadvantages attendant on the use of ultra-violet radiation-absorbing substances are minimised.

It will be understood that if the laminate is a flat sheet and both sides of the sheet are to be exposed to ultra-violet radiation, then the laminate must be made up of at least three laminae and that both of the external laminae must contain a substance that absorbs ultra-violet radiation. If, on the other hand, only one side of the laminate is to be exposed, only the external lamina on that side need contain the absorbing substance and in this case the laminate may if desired be made up of only two laminae. This may be the case, for example, if the laminate is a flat sheet that is to be used in an application in which it will be backed by an opaque material. Even in such cases, however, it may be preferred to use an external lamina containing the absorbing substance on both sides of the laminate separated by one or more laminae containing no absorbing substance, in order to avoid the risk of damage to the laminate which might otherwise result from inadvertent exposure of the unprotected surface to ultra-violet radiation.

It is preferred, in order to obtain the maximum benefit from the invention, that the only laminae to contain the ultra-violet radiation-absorbing substance should be external laminae.

The present invention is applicable, for example, to the production of laminates from polyvinyl chloride, vinyl chloride/vinyl acetate copolymers, vinyl chloride/vinylidene chloride copolymers, polystyrene and styrene/acrylonitrile copolymers and mixtures thereof with butadiene/acrylonitrile copolymers.

The ultra-violet radiation-absorbing substance may be any of those known to be suitable for use as stabilisers for polymeric materials. Examples of such substances are phenyl salicylate, resorcinol disalicylate, resorcinol mono- and di-benzoate, benzyl benzoate, stilbene, $\beta$-methyl umbelliferone, 4-methyl umbelliferone benzoate, 2,4-dihydroxy-benzophenone, and 2-hydroxy-4-methoxy benzophenone. The concentration of the ultra-violet radiation-absorbing substance used in the layer or layers of the laminate containing said substance need not differ from that in which said substance would be used if it were incorporated throughout the mass of the material.

The ultra-violet radiation-absorbing substance may be incorporated in the polymeric material by any method which ensures intimate mixing. For example, if the polymeric material is polyvinyl chloride or a vinyl chloride copolymer, a convenient method is uniformly to blend together the polymer and the ultra-violet radiation-absorbing substance and any other desired ancillary ingredients, such as plasticisers, lubricants, pigments, fillers and heat-stabilisers, by agitation in a Gardner mixer. The batch is next masticated in a Banbury mixer and is then transferred to a roll mill where the mixing is completed and the composition converted into a "crepe." The crepe thus obtained may be converted into a sheet suitable for use as a lamina in the process of the invention by feeding it to a calender. Alternatively, the crepe may, for example, be disintegrated and converted into sheet form by extrusion.

Laminae for use in the production of laminates according to the invention may be made by any of the conventional techniques, e.g. by calendering or extrusion, as already indicated, or by solvent- or melt-casting. The laminae may be laminated together by any of the conventional techniques, e.g. by hot-pressing, solvent-bonding or cementing. Hot-pressing may be carried out, for example, in a platen press or by passing the laminae through hot rolls or between a heated roll and an endless belt.

The laminae used in the production of the laminate need not be all of the same thickness or produced by the same method, nor need they necessarily all consist of the same polymeric material or contain the same ancillary ingredients. In the production of sheet materials from polystyrene, for example, a core for the laminate may be produced by extrusion and a thinner layer of polystyrene containing an ultra-violet radiation-absorbing substance laminated on to each surface of the core by hot-pressing. By using a core made of a high-impact strength polystyrene, e.g. polystyrene modified by the addition of a butadiene/styrene copolymer, and surface layers of unmodified polystyrene, a product having both high-impact strength and an excellent surface finish and which is also resistant to ultra-violet radiation can be obtained.

In addition to flat sheets, other laminated structures, e.g. shaped or curved sheets, angled sections and tubes, can be produced by the process of this invention by laminating together laminae of suitable configurations. Laminated tubes may be produced, for example, by laminating one or more laminae on to a pre-formed tube. The pre-formed tube may be made by any convenient technique e.g. by extrusion or by rolling up a flat sheet until the opposite edges come together and then joining these edges by cementing or welding. Cementing and welding, particularly welding by dielectric heating, are also convenient techniques for laminating a lamina or laminae on to the pre-formed tube. The lamina or laminae used may be shaped to the appropriate curvature before the laminating step or, if they are sufficiently flexible, can be flat sheets which are bent or wrapped around the pre-formed tube. Since in many applications of laminated tubes the interior of the tube is not exposed to ultra-violet radiation to any appreciable extent, it is often necessary for the ultra-violet radiation-absorbing substance to be present only on the outermost layer of the tube.

The process of the present invention is particularly valuable for the production of transparent and semi-transparent laminates and also for the production of laminates having light colours.

My invention is illustrated but not limited by the following example in which all parts are by weight.

*Example*

Two batches of calendered foil approximately .013 inch thick were made from compositions comprising 100 parts of a vinyl chloride/vinyl acetate copolymer containing the equivalent of 5% of vinyl acetate, and 2 parts of tin mercaptide (a heat stabiliser). The composition from which one batch of foil but not the other was made also contained 1 part of 2-hydroxy-4-methoxy benzophenone.

A sheet (A) approximately .0625 inch thick was made by pressing a stack of 5 foils under a pressure of ⅓ ton/sq. inch at a temperature of 175° C. for 10 minutes. The two outside foils but not the three inner ones contained 2-hydroxy-4-methoxy benzophenone.

A sheet (B) was produced by a similar method from 5 foils all of which contained 2-hydroxy-4-methoxy benzophenone and a further sheet (C) was similarly produced from 5 foils none of which contained 2-hydroxy-4-methoxy benzophenone.

The resistance to ultra-violet radiation of the three sheets thus obtained was measured by exposing a sample of each sheet in an "Agemaster" accelerated-weathering testing apparatus and taking readings at intervals of the optical density of the sample in the violet 621 (Ilford Bright Spectrum Filter Series) wave-length region. The initial impact strength of each sheet was also determined on another sample. The following results were obtained.

| Sheet | Optical density in violet 621 after exposure for— | | | | | Impact Strength, ft. lb. |
|---|---|---|---|---|---|---|
| | 0 | 262 | 478 | 742 | 1004 | |
| | hours in weathering apparatus | | | | | |
| A | 10 | 12 | 18 | 30 | 48 | 3.1 |
| B | 13 | 16 | 20 | 31 | 47 | 2.6 |
| C | 13 | 32 | 56 | 100 | >100 | 3.4 |

Sheets were also made by laminating 10 foils together. In one such sheet (D), the two outer foils but not the eight inner foils contained 2-hydroxy-4-methoxy benzophenone. In a second sheet (E) all of the foils contained 2-hydroxy-4-methoxy benzophenone. In a third sheet (F) none of the foils contained 2-hydroxy-4-methoxy benzophenone. The resistance of the sheets to ultra-violet radiation and their initial impact strength were determined by the same methods as were used for sheets A, B, and C and the following results obtained.

| Sheet | Optical density in violet 621 after exposure for— | | | | | Impact Strength, ft. lb. |
|---|---|---|---|---|---|---|
| | 0 | 262 | 478 | 742 | 1004 | |
| | hours in weathering apparatus | | | | | |
| D | 17 | 21 | 25 | 41 | 85 | 10.2 |
| E | 19 | 22 | 26 | 46 | 85 | 6.4 |
| F | 17 | 39 | 67 | >100 | >100 | 10.7 |

It will be seen from the above tables that the sheets containing the ultra-violet radiation-absorbing substance only in the surface layers had a resistance to ultra-violet radiation equal to those in which it was uniformly distributed throughout the sheet and that they had a superiority in impact strength which increased as the number of foils in the laminate increases. The resistance of sheets A and D to ultra-violet radiation is the more surprising when it is remembered that the overall concentration of the ultra-violet radiation-absorbing substance in these sheets was only 0.4 part and 0.2 part, respectively, per 100 parts of polymer, compared with 1 part per 100 parts of polymer in sheets B and E.

I claim:

1. A laminated structure of a vinyl chloride polymeric material which is resistant to ultraviolet radiation degradation comprising an external lamina of vinyl chloride polymeric material containing a substance which absorbs ultraviolet radiation dispersed therethrough and another lamina free from substances absorbing ultraviolet radiation which is protected from degradation by ultraviolet radiation by the first lamina.

2. A laminate according to claim 1 in which the substance that absorbs ultra-violet radiation is 2-hydroxy-4-methoxy benzophenone.

References Cited in the file of this patent

UNITED STATES PATENTS

| | | |
|---|---|---|
| 1,604,761 | Sherts | Oct. 26, 1926 |
| 1,969,473 | Murray | Aug. 7, 1934 |
| 2,160,907 | Richardson | June 6, 1939 |
| 2,263,249 | Rogers | Nov. 18, 1941 |
| 2,444,976 | Brown | July 18, 1948 |
| 2,568,894 | Mackey | Sept. 25, 1951 |
| 2,682,559 | Stanley et al. | June 29, 1954 |
| 2,693,492 | Hoch | Nov. 2, 1954 |
| 2,777,828 | Day et al. | Jan. 15, 1957 |
| 2,861,104 | Von Glahn et al. | Nov. 18, 1958 |
| 2,861,105 | Stanley et al. | Nov. 18, 1958 |